United States Patent
Ramirez et al.

(10) Patent No.: US 10,919,634 B2
(45) Date of Patent: Feb. 16, 2021

(54) INERT AMBIENT PRESSURE DELAY

(71) Applicant: GOODRICH CORPORATION, Charlotte, NC (US)

(72) Inventors: German Ramirez, Antioch, CA (US); Patrick Carver, Suisun City, CA (US)

(73) Assignee: Goodrich Corporation, Charlotte, NC (US)

( * ) Notice: Subject to any disclaimer, the term of this patent is extended or adjusted under 35 U.S.C. 154(b) by 295 days.

(21) Appl. No.: 16/023,722

(22) Filed: Jun. 29, 2018

(65) Prior Publication Data

US 2020/0002012 A1 Jan. 2, 2020

(51) Int. Cl.
*F42D 1/04* (2006.01)
*F42B 1/02* (2006.01)
*B64D 25/10* (2006.01)

(52) U.S. Cl.
CPC ............. *B64D 25/10* (2013.01); *F42B 1/02* (2013.01); *F42D 1/043* (2013.01)

(58) Field of Classification Search
CPC . B64C 1/32; B64C 25/08; B64C 25/10; F42B 1/02; F42D 1/043
See application file for complete search history.

(56) References Cited

U.S. PATENT DOCUMENTS

| | | | | |
|---|---|---|---|---|
| 3,424,409 A * | 1/1969 | Stanley | ............... | B64D 25/08 244/122 R |
| 3,602,141 A | 8/1971 | Sutter et al. | | |
| 3,862,731 A * | 1/1975 | McIntyre | ............... | B64D 25/10 244/141 |
| 4,978,089 A * | 12/1990 | Alquier | ............... | B64C 1/32 102/223 |
| 2015/0375845 A1* | 12/2015 | Salgues | ............... | B64C 1/1407 244/129.5 |

* cited by examiner

*Primary Examiner* — Philip J Bonzell
*Assistant Examiner* — Tye William Abell
(74) *Attorney, Agent, or Firm* — Snell & Wilmer L.L.P.

(57) ABSTRACT

A pressure delay mechanism is disclosed. In various embodiments, the mechanism includes a triggering mechanism operably coupled to an input signal port and to an output signal port and configured to transmit a signal from the input signal port to the output signal port and a differential pressure mechanism operably coupled to an exterior pressure input and to an interior pressure input and configured to lock the triggering mechanism during a first state of pressure difference and to unlock the triggering mechanism during a second state of pressure difference.

16 Claims, 4 Drawing Sheets

INERT AMBIENT PRESSURE DELAY

FIELD

The present disclosure relates generally to ambient pressure delays and, more particularly, to inert ambient pressure delays used with emergency egress systems for high-altitude aircraft.

BACKGROUND

Ambient pressure delays are component parts that may be used in emergency egress systems for aircraft having high-altitude capabilities. In various uses, ambient pressure delays allow the transfer of a signal from an input port to an output port when a pressure differential between the cockpit pressure and the outside ambient pressure falls below a threshold value. Transfer of the signal triggers separation of a cockpit canopy or an escape hatch followed by initiation of an ejection seat.

Ambient pressure delays typically contain energetic materials utilized to transfer a signal, such as a flame front, through the device, from the input port to the output port. The energetic materials contained within such devices may pose potential drawbacks, for example, during shipping, handling, storage, installation, repair and removal. The presence of energetic materials within such devices may also limit otherwise available shipping options, increase the shipping price and reduce the shelf and service lives of the devices. The present disclosure is directed to inert ambient pressure delays that reduce or eliminate the use of energetic materials internal to the delays and, therefore, exhibit fewer potential drawbacks during shipping and use.

SUMMARY

A pressure delay mechanism is disclosed. In various embodiments, the mechanism includes a triggering mechanism operably coupled to an input signal port and to an output signal port and configured to transmit a signal from the input signal port to the output signal port and a differential pressure mechanism operably coupled to an exterior pressure input and to an interior pressure input and configured to lock the triggering mechanism during a first state of pressure difference and to unlock the triggering mechanism during a second state of pressure difference.

In various embodiments, the triggering mechanism comprises a bolt slidably disposed within a housing, the bolt having a first end operably coupled to the input signal port and a second end operably coupled to the output signal port. In various embodiments, the differential pressure mechanism is configured to lock the bolt from translational movement during the first state of pressure difference and to unlock the bolt from translational movement during the second state of pressure difference. In various embodiments, the mechanism further includes a firing pin and a biasing member disposed between the second end of the bolt and the firing pin. In various embodiments, the first end of the bolt is operably coupled to the input signal port via an input pyrotechnic pressure donor. In various embodiments, the second end of the bolt is operably coupled to the output signal port via an output percussive primer configured for ignition by the firing pin.

In various embodiments, the differential pressure mechanism includes a bellows mechanism. In various embodiments, the bellows mechanism includes a sliding shaft configured to lock the triggering mechanism during the first state of pressure difference and to unlock the triggering mechanism during the second state of pressure difference. In various embodiments, the triggering mechanism includes a bolt slidably disposed within a housing, the bolt having a first end operably coupled to the input signal port and a second end operably coupled to the output signal port. In various embodiments, the mechanism further includes a firing pin and a biasing member disposed between the second end of the bolt and the firing pin. In various embodiments, the first end of the bolt is operably coupled to the input signal port via an input pyrotechnic pressure donor and wherein the second end of the bolt is operably coupled to the output signal port via an output percussive primer configured for ignition by the firing pin.

A pressure delay mechanism is disclosed. In various embodiments, the mechanism includes a housing, a bolt slidably disposed within the housing, the bolt having a first end operably coupled to an input signal port and a second end operably coupled to an output signal port, and a differential pressure mechanism operably coupled to an exterior pressure input and to an interior pressure input and configured to lock the bolt during a first state of pressure difference and to unlock the bolt during a second state of pressure difference.

In various embodiments, the differential pressure mechanism includes a bellows mechanism configured to lock the bolt from translational movement during the first state of pressure difference and to unlock the bolt from translational movement during the second state of pressure difference. In various embodiments, the mechanism further includes a firing pin and a biasing member disposed between the second end of the bolt and the firing pin. In various embodiments, the first end of the bolt is operably coupled to the input signal port via an input pyrotechnic pressure donor and wherein the second end of the bolt is operably coupled to the output signal port via an output percussive primer configured for ignition by the firing pin.

An emergency egress system for an aircraft is disclosed. In various embodiments, the system includes an ejection seat having an ejection seat handle and an ejection seat catapult; a canopy having a canopy catapult; a pressure equalization port; a pressure delay mechanism, including a housing, a bolt slidably disposed within the housing, the bolt having a first end operably coupled to an input signal port and a second end operably coupled to an output signal port, and a differential pressure mechanism operably coupled to an exterior pressure input and to an interior pressure input and configured to lock the bolt during a first state of pressure difference and to unlock the bolt during a second state of pressure difference; a first segment of thin layer explosive connecting the ejection seat handle to the input signal port and to the pressure equalization port; a second segment of thin layer explosive connecting the output signal port to the canopy catapult; and a third segment of thin layer explosive connecting the canopy catapult to the ejection seat catapult.

In various embodiments, the system further includes a firing pin and a biasing member disposed between the second end of the bolt and the firing pin. In various embodiments, the first end of the bolt is operably coupled to the input signal port via an input pyrotechnic pressure donor and wherein the second end of the bolt is operably coupled to the output signal port via an output percussive primer configured for ignition by the firing pin. In various embodiments, the differential pressure mechanism comprises a bellows mechanism. In various embodiments, the bellows mechanism includes a sliding shaft configured to lock the bolt during the first state of pressure difference and to unlock the bolt during the second state of pressure difference.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1A:
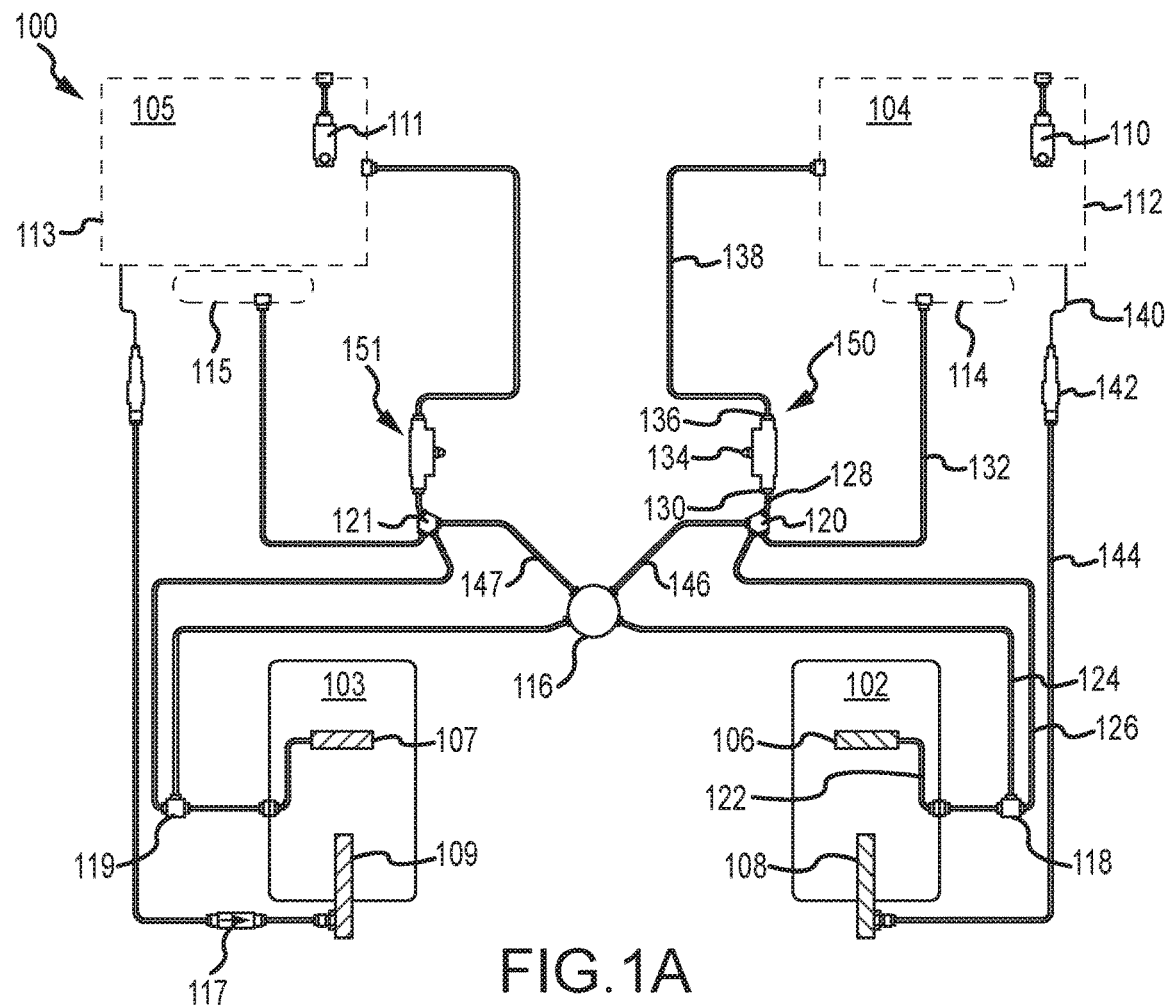
FIG. 1A is a schematic block diagram of an emergency escape system for a high altitude aircraft using an inert ambient pressure delay, in accordance with various embodiments.

Referring now to the drawings, FIG. 1A schematically illustrates an emergency egress system 100 for a high altitude aircraft using an inert ambient pressure delay ("inert ADP"), in accordance with various embodiments. While the emergency egress system 100 will be described as providing emergency egress for two pilots or cockpit occupants, the same principles disclosed herein are applicable to embodiments having one pilot or several pilots or cockpit occupants. As will be described in further detail below, the emergency egress system 100 includes a first inert ambient pressure delay 150 and a second inert ambient pressure delay 151. Additional details of the first inert ambient pressure delay 150 and the second inert ambient pressure delay 151 will be provided below, following a general description of the emergency egress system 100.

As indicated, the emergency egress system 100 provides emergency egress for two occupants—e.g., pilots—and, therefore, is described as including a first ejection seat 102 and a second ejection seat 103. In various embodiments, the first ejection seat 102 may be positioned behind the second ejection seat 103 or the ejections seats may be positioned aside one another. In various embodiments, a first canopy 104 will correspond with the first ejection seat 102 and a second canopy 105 will correspond with the second ejection seat 103. In various embodiments, the first ejection seat 102 has associated therewith a first seat handle 106, which is used to initiate an ejection, and a first seat catapult 108 (e.g., a first rocket motor) that is used to catapult the first ejection seat 102 away from the aircraft. Similarly, the second ejection seat 103 has associated therewith a second seat handle 107 and a second seat catapult 109.

Associated with the first canopy 104 is a first canopy catapult 110 (e.g., a first canopy rocket motor) that is used to catapult the first canopy 104 away from the aircraft, a first explosive cord 112 (e.g., a first linear shaped charge) that is used to cut the first canopy 104 away from the aircraft prior to activation of the first canopy catapult 110 and a first pressure equalization port 114 that is used to provide an opening between the first canopy 104 and the outside or ambient air; or between a first cockpit enclosed by the first canopy 104 and the outside or ambient air. In various embodiments, the first pressure equalization port 114 may be established by an explosive cord or linear shaped charge disposed at a suitable location within the first cockpit. Similarly, the second canopy 105 has associated therewith a second canopy catapult 111, a second explosive cord 113 and a second pressure equalization port 115.

As described further below, the various components identified above are interconnected using thin layer explosive ("TLX") cords positioned between the components and a primary manifold 116, a first manifold 118 and a second manifold 120, associated with the first ejection seat 102 and the first canopy 104, and a third manifold 119 and a fourth manifold 121, associated with the second ejection seat 103 and the second canopy 105. In various embodiments, the primary manifold 116 may be set to either an automatic mode or a manual mode. During the automatic mode, both the first ejection seat 102 and the second ejection seat 103 (and the corresponding first canopy 104 and second canopy 105) are activated upon activation of either the first seat handle 106 or the second seat handle 107. A time delay 117 associated with the second ejection seat 103 ensures the first ejection seat 102 and the second ejection seat 103 are not catapulted at the same instant of time while the primary manifold 116 is set to the automatic mode. During the manual mode, the first ejection seat 102 (and the corresponding first canopy 104) is activated only upon activation of the first seat handle 106 and the second ejection seat 103 (and the corresponding second canopy 105) is activated only upon activation of the second seat handle 107.

Figure 1B:
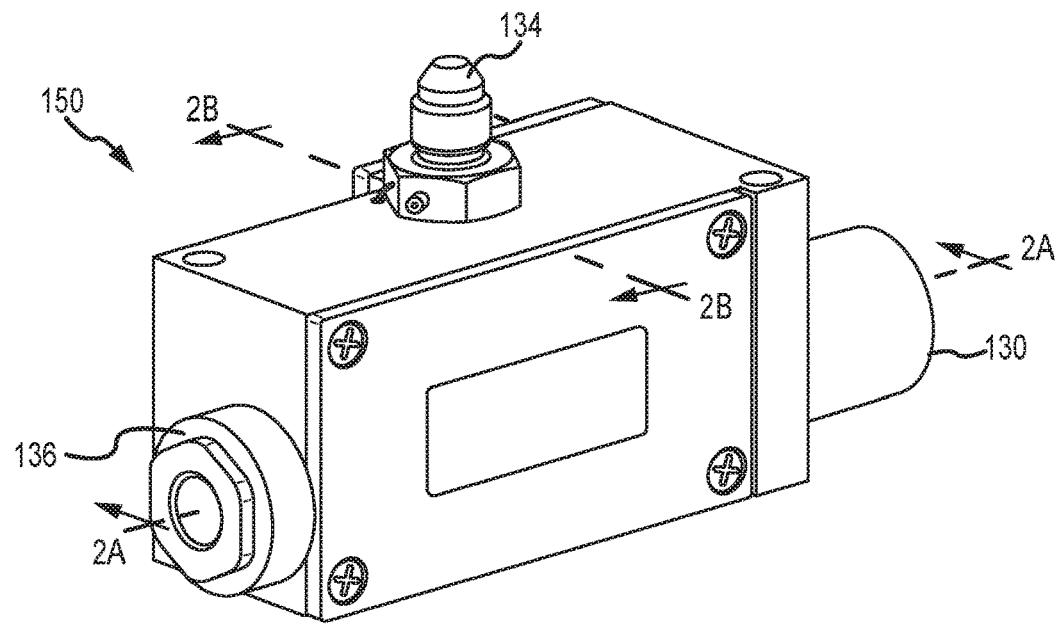
FIG. 1B is an inert ambient pressure delay illustrated schematically in FIG. 1A, in accordance with various embodiments.

Referring now to FIGS. 1A and 1B, operation of the emergency egress system 100 may be illustrated, in accordance with various embodiments. In general, operation of the emergency egress system 100, having an inert ambient pressure delay, may be understood by describing operation of the first ejection seat 102, isolated from the second ejection seat 103. This mode of operation may be achieved by setting the primary manifold 116 to manual mode, which isolates operation of the first ejection seat 102 from the second ejection seat 103, together with the first canopy 104 and second canopy 105, respectively. More specifically, operation of the first ejection seat 102 and the first canopy 104 commences by activation of the first seat handle 106. Activation of the first seat handle 106 activates burning of a first segment 122 of TLX toward the first manifold 118. Following the first manifold 118, a second segment 124 and third segment 126 of TLX propagates signals (flame fronts) toward the primary manifold 116 and the second manifold 120, respectfully. Because the primary manifold 116 is set to manual mode, the second segment 124 is prevented from igniting any of the TLX segments entering or exiting the primary manifold 116 upon arrival of the signal being propagated by the second segment 124. The third segment 126 of TLX, on the other hand, propagates a signal to the second manifold 120, following which a third segment 128 of TLX propagates a signal toward an input port 130 of the first inert ambient pressure delay 150 while a fourth segment 132 of TLX propagates a signal toward the first pressure equalization port 114. As referred to above, the first pressure equalization port 114 is used to provide an opening between the first canopy 104 and the outside or ambient air, which occurs once the signal being propagated in the fourth segment 132 of TLX arrives at the port.

Following activation of the first pressure equalization port 114, the relatively high pressure within the first cockpit, enclosed by the first canopy 104, begins to drop toward the relatively low pressure of the outside or ambient air. The first inert ambient pressure delay 150 monitors the pressure differential between the two sources by comparing the pressure of the outside or ambient air, provided to the first inert ambient pressure delay 150 by a tube leading from outside the aircraft to an ambient pressure input 134, and the pressure within the first cockpit. Once the pressure differential drops below a threshold value, an inert mechanism within the first inert ambient pressure delay 150 ignites an output port 136 which, in turn, ignites a fifth segment 138 of TLX. The fifth segment 138 of TLX propagates toward and ignites the first explosive cord 112, which cuts the first canopy 104 from the first cockpit, and the first canopy catapult 110, which then catapults the first canopy 104 away from the aircraft. During the catapulting of the first canopy 104 from the first cockpit, a first lanyard 140, connecting the first canopy 104 to a first pull initiator 142, triggers the first pull initiator 142, which thereby ignites a sixth segment 144 of TLX. The signal being propagated by the sixth segment 144 of TLX subsequently ignites the first seat catapult 108, which then catapults the first ejection seat 102, together with its occupant, away from the aircraft.

Operation of the second ejection seat 103 and the second canopy 105, with the primary manifold 116 set to manual mode, operates in identical fashion as the operation of the first ejection seat 102 and first canopy 104 above described, so need not be repeated here. Where the primary manifold 116, is set to automatic mode, however, the emergency egress system 100 is configured to activate the seats and canopies of both the first cockpit and the second cockpit, upon activation of either the first seat handle 106 or the second seat handle 107. For example, upon activation of the first seat handle 106, a signal will propagate along both the second segment 124 and third segment 126 of TLX as above described. The signal propagated by the third segment of TLX will catapult the first canopy 104, followed by the first ejection seat 102, exactly as described above. However, rather than the signal propagating in the second segment 124 of TLX being terminated at the primary manifold 116, as described above, the signal will continue through the primary manifold 116 and ignite a second bridge segment 147 of TLX that bridges the primary manifold 116 and the fourth manifold 121. Activation of the second ejection seat 103 and the second canopy 105 systems will then proceed identically as described above with the first cockpit counterparts, the only exception being a slight delay in activation of the second seat catapult 109 due to the time delay 117, which ensures both seats are not ejected simultaneously. A first bridge segment 146 of TLX, that bridges the primary manifold 116 and the second manifold 120, ensures operation of the catapults of both seats and canopies in the event the second seat handle 107 is operated.

Referring now to FIGS. 2A, 2B, 2C, 2D and 2E, assembly and operation of an inert ambient pressure delay 250, similar to the first inert ambient pressure delay 150 and the second inert ambient pressure delay 151, described above with reference to FIGS. 1A and 1B, is described, in accordance with various embodiments. Generally, the inert ambient pressure delay 250 includes an input port 230 (or input signal port), an ambient pressure input 234 (or first or exterior pressure input) and an output port 236 (or output signal port). A housing 252 provides a structure to mount the various input and output ports and the internal mechanisms used to switch the delay from a first or non-operational state (see FIGS. 2A, 2B and 2C), a second or operational state (see FIG. 2D) and a third or fired state (see FIG. 2E).

Figure 2A:
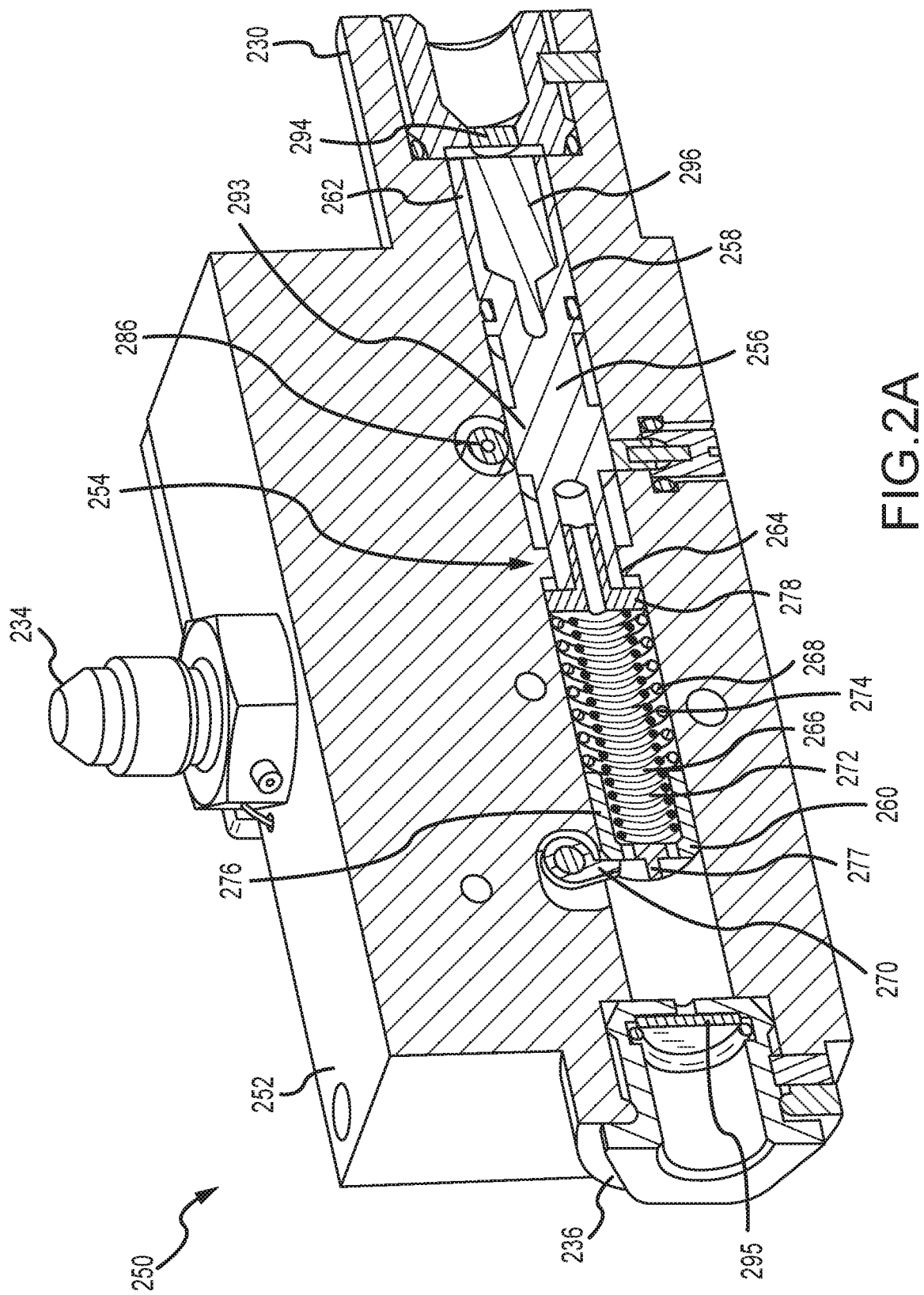
FIGS. 2A, 2B, 2C, 2D and 2E are schematic cutaway views of an inert ambient pressure delay, in accordance with various embodiments.

Referring to FIG. 2A, the inert ambient pressure delay 250 is illustrated in a first or non-operational state. A firing mechanism 254 generally includes a bolt 256 slidably disposed in a chamber 258 and a firing pin 260. In various embodiments, the bolt 256 may be characterized as having a first end 262 positioned proximate the input port 230 (while in the first or non-operational state) and a second end 264 extending toward the output port 236. A first biasing member 266 (e.g., a first coil spring) is positioned between the firing pin 260 and the second end 264 of the bolt 256. A second biasing member 268 (e.g., a second coil spring) is also positioned between the firing pin 260 and the second and the second end 264 of the bolt 256. While in the first or non-operational state, a latch lever 270 locks the firing pin 260 from forward movement.

In various embodiments, the first biasing member 266 is a first coil spring 272 and the second biasing member 268 is a second coil spring 274, with the first coil spring 272 disposed coaxially within the second coil spring 274. In various embodiments, the firing pin 260 may comprise a cup-shaped member 276 having a protrusion 277 extending from a base of the cup-shaped member 276 and configured to ignite a percussive primer positioned within the output port 236. In various embodiments, the first coil spring 272 has a first end positioned within the cup-shaped member 276 and against the base thereof and a second end positioned against the second end 264 of the bolt 256. In various embodiments, the second coil spring 274 has a first end positioned against a rim portion of the cup-shaped member 276 and a second end positioned against the second end 264 of the bolt 256. In various embodiments, the firing mechanism 254 further includes an arming lug 278 disposed between the second end 264 of the bolt 256 and the second ends of the first coil spring 272 and the second coil spring 274. In various embodiments, the first coil spring 272 and the second coil spring 274 have different lengths and spring constants, with the first coil spring 272 typically having an uncompressed length longer than that of the second coil spring 274 and a spring constant less than that of the second coil spring 274.

Figure 2B:
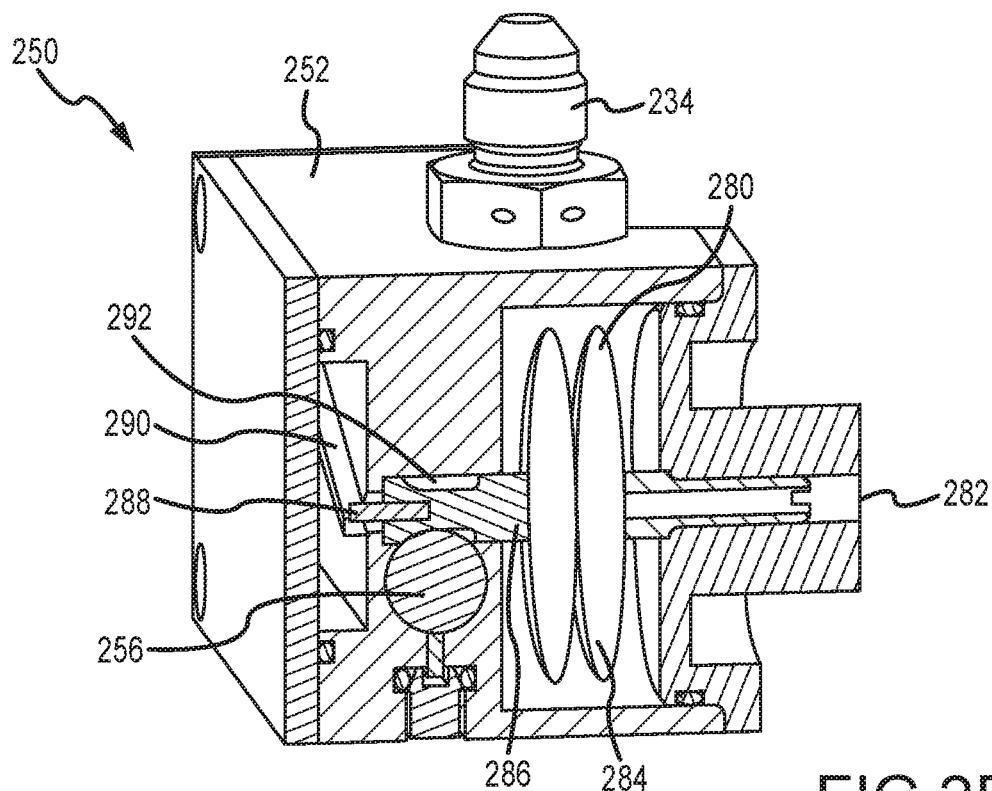
Figure 2C:
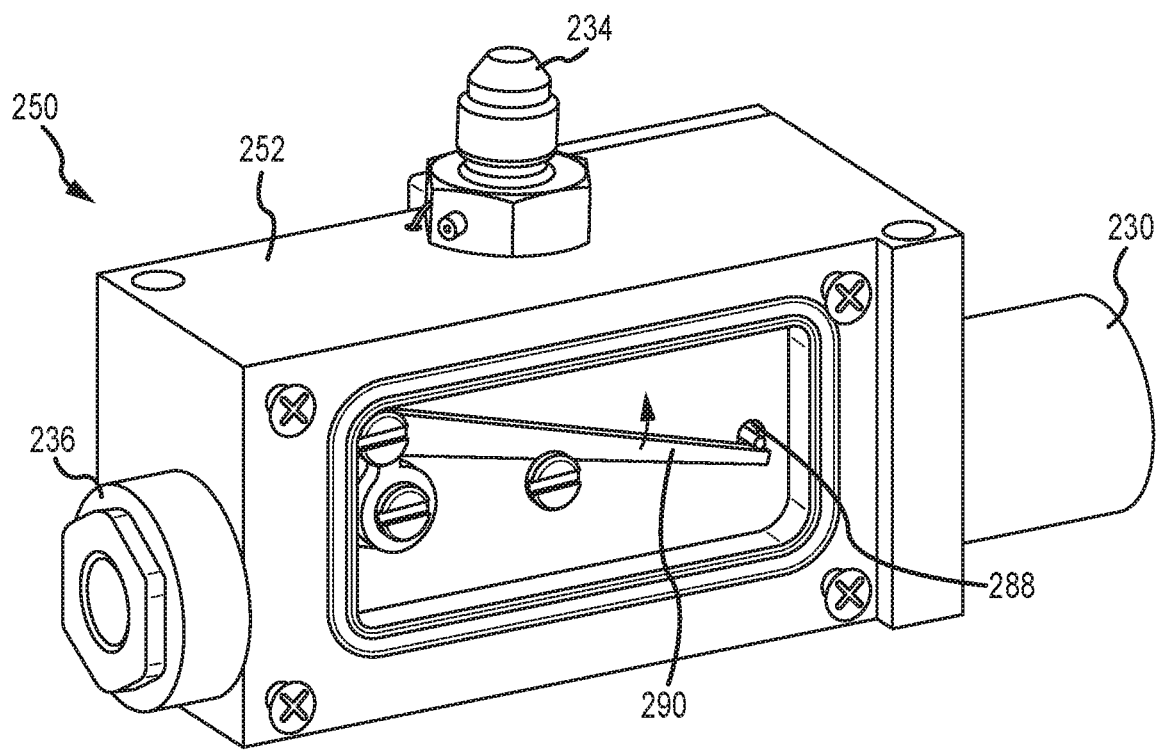

Referring now to FIGS. 2A, 2B and 2C, in various embodiments, the inert ambient pressure delay 250 includes various locking and unlocking mechanisms, in accordance with various embodiments. For example, a bellows mechanism 280 is operably coupled to a cockpit pressure input 282 (or second or interior pressure input) and the ambient pressure input 234. In various embodiments, the bellows mechanism 280 includes one or more bellows 284 and a sliding shaft 286 having a pin member 288 disposed at the end of the sliding shaft 286. The bellows mechanism 280 responds to a pressure difference, $\Delta P$, between the cockpit pressure, $P_C$, registered at the cockpit pressure input 282, and the ambient pressure, $P_A$, registered at the ambient pressure input 234. Generally, during conditions where $\Delta P = P_C - P_A$ is greater than or equal to 1.2 pounds per square inch differential ("psid") ($\Delta P \geq 1.2$ psid (8.27 kPad)), the one or more bellows 284 are expanded sufficiently to cause the sliding shaft 286 and pin member 288 to slide toward and engage with a locking lever 290, preventing the locking lever from pivoting upward, as depicted in FIG. 2C. During conditions where $\Delta P < 1.2$ psid (8.27 kPad), the one or more bellows 284 may become contracted sufficiently to cause the sliding shaft 286 and pin member 288 to slide away from and disengage with the locking lever 290, allowing the locking lever 290 to pivot upward as indicated by the arrow in FIG. 2C. As illustrated in FIGS. 2A, 2B and 2C, the locking lever 290 is operably coupled to the latch lever 270. While the locking lever 290 assumes a locked position, as illustrated in FIGS. 2B and 2C, the latch lever 270 also assumes a locked position, preventing the firing pin 260 from translating toward the output port 236 by action of the first coil spring 272 or the second coil spring 274, as illustrated in FIG. 2A.

Referring now to each of FIGS. 2A-2E, operation of the inert ambient pressure delay 250 is described. As described above with reference to FIGS. 2A-2C, the inert ambient pressure delay 250 initially assumes a first or non-operational state, where the bolt 256 is fully retracted toward the input port 230 and the latch lever 270 engages the firing pin 260, preventing the firing pin 260 from translating toward the output port 236. In this same state, the bellows mechanism 280 is set manually such that the sliding shaft 286 pin member 288 are fully extended to engage the locking lever 290. Further, following the manual setting of the bellows mechanism 280, a recess portion 292 of the sliding shaft 286 (see FIG. 2B) engages an outer portion of the bolt 256 at an engaging location 293 (see FIG. 2A), thereby preventing the bellows mechanism 280 from retracting under conditions where $\Delta P < 1.2$ psid (8.27 kPad) (e.g., during shipment or while the aircraft is not flying at altitude).

Figure 2D:
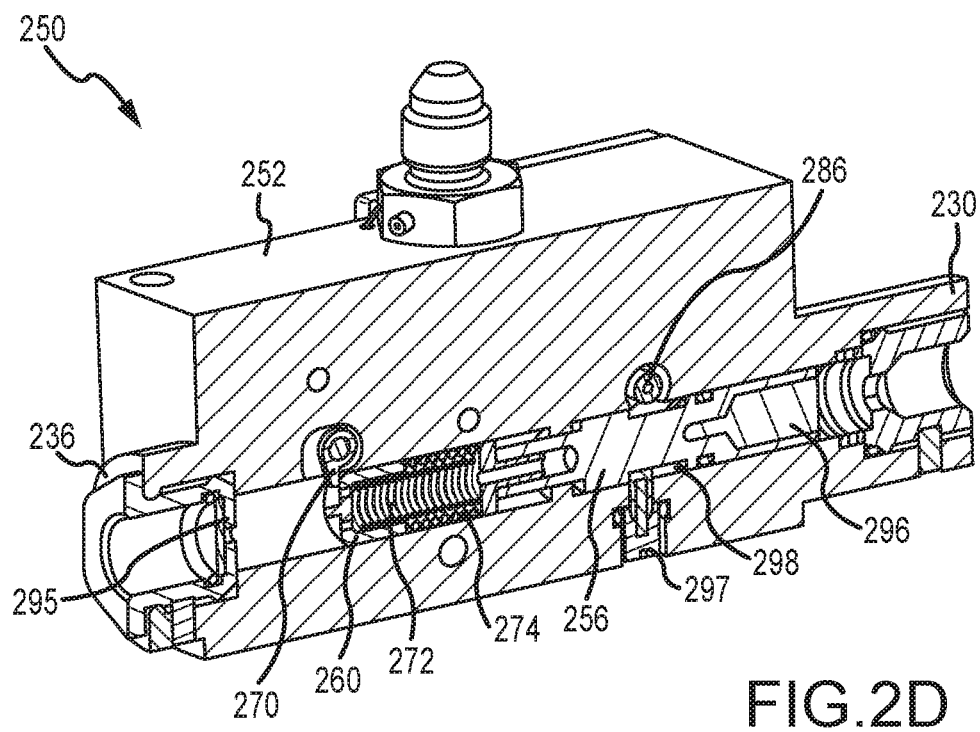

Referring now to FIG. 2D, the inert ambient pressure delay 250 is illustrated in the second or operational state. Starting from the first or non-operational state, a signal, such as that propagated by the third segment 128 of TLX described above with reference to FIG. 1A, arrives at the input port 230, igniting an input pyrotechnic pressure donor 294. The input pyrotechnic pressure donor 294 generates a pressure spike that propels the bolt 256 toward the output port 236. In various embodiments, a damper material 296 (e.g., an epoxy material) may be incorporated into the first end 262 of the bolt 256 to dampen the impact of the pressure spike. As the bolt 256 is thrust forward, against the biasing force of the first coil spring 272 and the second coil spring 274, a spring loaded pin 297 is thrust into a recess 298 in the bolt 256, thereby preventing the bolt 256 from being pushed back toward the input port by the force applied by the first coil spring 272 and the second coil spring 274, which are now compressed following translation of the bolt 256 toward the output port 236. At the same time, the recess 298, which may extend circumferentially about the bolt 256, is positioned adjacent the sliding shaft 286 of the bellows mechanism 280, thereby permitting the sliding shaft 286 and pin member 288 to disengage the locking lever 290 upon contraction of the one or more bellows 284 once $\Delta P$ drops below a threshold value (e.g., once $\Delta P < 1.2$ psid (8.27 kPad)). In the second, or operational state, the aircraft may be assumed, in various embodiments, to be flying at altitude while the ejection process is initiated—e.g., by activating the first seat handle 106 or the second seat handle 107 described above with reference to FIG. 1A.

Figure 2E:
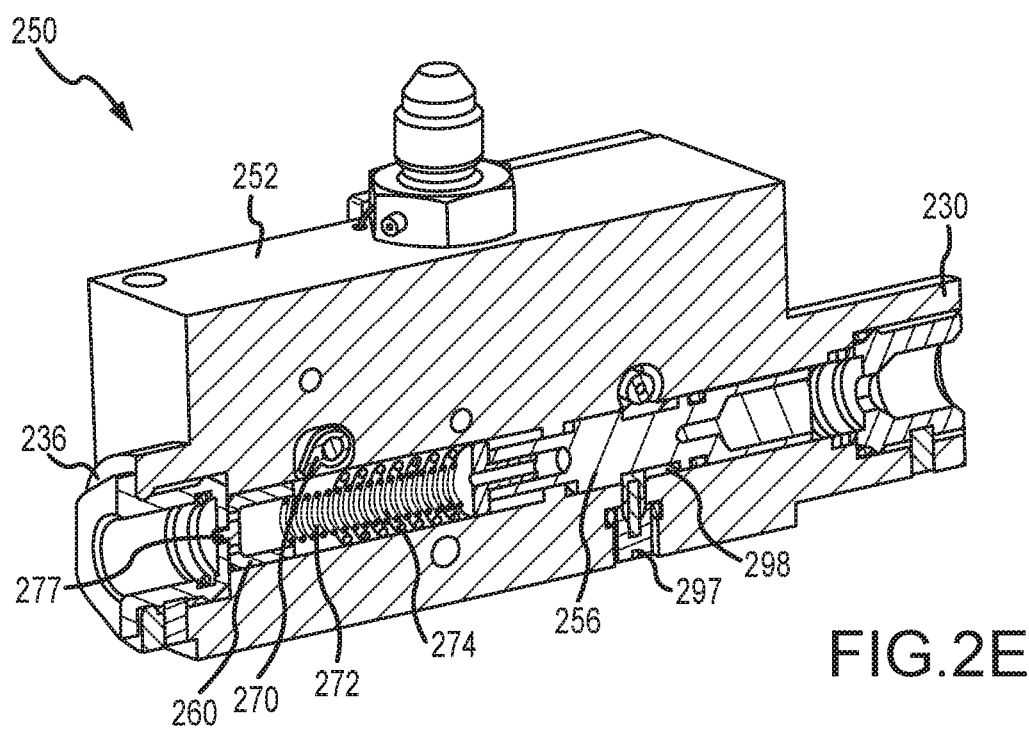

Referring now to FIG. 2E, the inert ambient pressure delay 250 is illustrated in the third or fired state. Starting from the second or operational state, the pressure difference $\Delta P$ will begin to drop from a value greater than $\Delta P = 1.2$ psid (8.27 kPad), following, for example, activation of first pressure equalization port 114 or the second pressure equalization port 115 described above with reference to FIG. 1A. Once $\Delta P$ drops below the threshold value (e.g., once $\Delta P < 1.2$ psid (8.27 kPad)), the one or more bellows 284 contract sufficiently to disengage the sliding shaft 286 and pin member 288 from the locking lever 290. With the locking lever 290 disengaged, the latch lever 270 is allowed to rotate upward by operation of the first coil spring 272 and the second coil spring 274 pushing against the firing pin 260. The firing pin 260 is then rapidly thrust toward the output port 236 through release of energy stored in the first coil spring 272 and the second coil spring 274 following ignition and explosion of the input pyrotechnic pressure donor 294. Once the firing pin 260 reaches the output port 236, the protrusion 277 strikes and ignites an output percussive primer 295 which, in turn, ignites a segment of TLX, such as, for example, the fifth segment 138 of TLX described above with reference to FIG. 1A, which ultimately results in the processes leading to ejection, as described above.

The foregoing describes generally the operation of the inert ambient pressure delay 250 during high-altitude flight conditions, where a delay in ejection is required to reduce the pressure within the cockpit toward the pressure of the outside or ambient air, thereby protecting occupants of the aircraft cockpit from being exposed to a sudden and potentially violent pressure difference upon ejection. As described above, operation of the inert ambient pressure delay in such conditions assumes the initial pressure difference, $\Delta P = P_C - P_A$, is greater than or equal to 1.2 psid ($\Delta P \geq 1.2$ (8.27 kPad)). For conditions where $\Delta P < 1.2$ psid (8.27 kPad)—e.g., during low-altitude flight—the pressure difference $\Delta P$ is assumed low enough that no delay prior to ejection is required. In such case, ejection follows substantially the same steps as described above, the only difference being that following the device assuming the second or operational state (see FIG. 2D), the bellows mechanism 280 immediately retracts the sliding shaft 286 and pin member 288 from the locking lever 290, which results in near immediate ignition of the output percussive primer 295, as described above, followed by ejection of the cockpit occupant as also above described.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching. Further, throughout the present disclosure, like reference numbers denote like elements. Accordingly, elements with element numbering may be shown in the figures, but may not necessarily be repeated herein for the sake of clarity.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A pressure delay mechanism, comprising:
    a triggering mechanism operably coupled to an input signal port and to an output signal port and configured to transmit a signal from the input signal port to the output signal port; and
    a differential pressure mechanism operably coupled to an exterior pressure input and to an interior pressure input and configured to lock the triggering mechanism during a first state of pressure difference and to unlock the triggering mechanism during a second state of pressure difference,
    wherein the triggering mechanism comprises a bolt slidably disposed within a housing, the bolt having a first end operably coupled to the input signal port and a second end operably coupled to the output signal port and
    wherein the differential pressure mechanism is configured to lock the bolt from translational movement during the first state of pressure difference and to unlock the bolt from translational movement during the second state of pressure difference.

2. The pressure delay mechanism of claim 1, wherein the differential pressure mechanism comprises a bellows mechanism.

3. The pressure delay mechanism of claim 2, wherein the bellows mechanism includes a sliding shaft configured to lock the triggering mechanism during the first state of pressure difference and to unlock the triggering mechanism during the second state of pressure difference.

4. The pressure delay mechanism of claim 1, further comprising a firing pin and a biasing member disposed between the second end of the bolt and the firing pin.

5. The pressure delay mechanism of claim 4, wherein the first end of the bolt is operably coupled to the input signal port via an input pyrotechnic pressure donor and wherein the second end of the bolt is operably coupled to the output signal port via an output percussive primer configured for ignition by the firing pin.

6. The pressure delay mechanism of claim 1, further comprising a firing pin and a biasing member disposed between the second end of the bolt and the firing pin.

7. The pressure delay mechanism of claim 6, wherein the first end of the bolt is operably coupled to the input signal port via an input pyrotechnic pressure donor.

8. The pressure delay mechanism of claim 7, wherein the second end of the bolt is operably coupled to the output signal port via an output percussive primer configured for ignition by the firing pin.

9. A pressure delay mechanism, comprising:
    a housing;
    a bolt slidably disposed within the housing, the bolt having a first end operably coupled to an input signal port and a second end operably coupled to an output signal port; and
    a differential pressure mechanism operably coupled to an exterior pressure input and to an interior pressure input and configured to lock the bolt during a first state of pressure difference and to unlock the bolt during a second state of pressure difference,
    wherein the differential pressure mechanism includes a bellows mechanism configured to lock the bolt from translational movement during the first state of pressure difference and to unlock the bolt from translational movement during the second state of pressure difference.

10. The pressure delay mechanism of claim 9, further comprising a firing pin and a biasing member disposed between the second end of the bolt and the firing pin.

11. The pressure delay mechanism of claim 10, wherein the first end of the bolt is operably coupled to the input signal port via an input pyrotechnic pressure donor and wherein the second end of the bolt is operably coupled to the output signal port via an output percussive primer configured for ignition by the firing pin.

12. An emergency egress system for an aircraft, comprising:
- an ejection seat having an ejection seat handle and an ejection seat catapult;
- a canopy having a canopy catapult;
- a pressure equalization port;
- a pressure delay mechanism, comprising:
  - a housing;
  - a bolt slidably disposed within the housing, the bolt having a first end operably coupled to an input signal port and a second end operably coupled to an output signal port; and
  - a differential pressure mechanism operably coupled to an exterior pressure input and to an interior pressure input and configured to lock the bolt during a first state of pressure difference and to unlock the bolt during a second state of pressure difference;
- a first segment of thin layer explosive connecting the ejection seat handle to the input signal port and to the pressure equalization port;
- a second segment of thin layer explosive connecting the output signal port to the canopy catapult; and
- a third segment of thin layer explosive connecting the canopy catapult to the ejection seat catapult.

13. The emergency egress system of claim 12, further comprising a firing pin and a biasing member disposed between the second end of the bolt and the firing pin.

14. The emergency egress system of claim 13, wherein the first end of the bolt is operably coupled to the input signal port via an input pyrotechnic pressure donor and wherein the second end of the bolt is operably coupled to the output signal port via an output percussive primer configured for ignition by the firing pin.

15. The emergency egress system of claim 12, wherein the differential pressure mechanism comprises a bellows mechanism.

16. The emergency egress system of claim 15, wherein the bellows mechanism includes a sliding shaft configured to lock the bolt during the first state of pressure difference and to unlock the bolt during the second state of pressure difference.

* * * * *